United States Patent [19]
Forsse et al.

[11] Patent Number: 5,807,176
[45] Date of Patent: Sep. 15, 1998

[54] STATION FOR PROVIDING REMOTE INTERACTIVITY WITH A MULTIMEDIA SOURCE

[76] Inventors: Earl K. Forsse; Janis R. Forsse, both of 34341 Amber Lantern St., Dana Point, Calif. 92629-3001

[21] Appl. No.: 683,527

[22] Filed: Jul. 15, 1996

[51] Int. Cl.[6] .................................................. G09B 5/00
[52] U.S. Cl. ............................................ 463/37; 434/317
[58] Field of Search ...................... 463/36, 37; 434/317; 345/173, 901, 133; 281/15.1, 16, 17, 21.1, 45, 51

[56] References Cited

U.S. PATENT DOCUMENTS

| | | |
|---|---|---|
| 5,263,865 | 11/1993 | Zipf . |
| 5,338,125 | 8/1994 | Forsse et al. . |
| 5,407,231 | 4/1995 | Schwartz ................................... 281/16 |
| 5,417,575 | 5/1995 | McTaggart ............................... 434/317 |
| 5,484,292 | 1/1996 | McTaggart ............................... 434/317 |
| 5,485,176 | 1/1996 | Ohara et al. ............................. 345/173 |

*Primary Examiner*—George Manuel
*Attorney, Agent, or Firm*—Kelly Bauersfeld; Lowry & Kelley, LLP

[57] ABSTRACT

An interactive game board or pages of interactive paper are attached to a platform designed to channel power to the game board/interactive paper and to receive signals therefrom. A transmitter unit that is removably attached to the platform provides power to the platform and transmits signals from the game board/interactive paper to a multimedia source, such as a computer or a CD-ROM player. Signals are generated at the interactive game board and interactive paper by means of touch pads that each permit completion of one of a plurality of distinct electrical circuits. Play pieces capable of generating a unique signal through the game board are also provided.

22 Claims, 6 Drawing Sheets

STATION FOR PROVIDING REMOTE INTERACTIVITY WITH A MULTIMEDIA SOURCE

BACKGROUND OF THE INVENTION

This invention relates generally to means for accessing audio and video information from multimedia sources such as computers and/or CD-ROM players. More specifically, the present invention relates to an interactive binder/platform wherein tactile input is translated into an electronic signal which is transmitted to a remote receiver associated with the computer/CD-ROM player.

The widespread availability and use of personal computers has revolutionized information management worldwide. With improvements in computer memory and speed, applications are being developed which enable tasks to be performed today which only a few short years ago could be accomplished only through the use of large, main-frame computers. Computers are routinely utilized for tasks such as word processing, accounting, inventory control and desktop publishing, as well as a myriad of other uses. Increasingly, CD-ROM drives are incorporated into personal computing work stations, primarily because CD-ROM disks are capable of storing a great deal of information which may be accessed quickly.

Many tasks and operations which were formerly accomplished utilizing books, manuals, writing paper and/or boards, are now routinely accomplished by means of the personal computer, wherein interactivity between the information of a software program and the user is accomplished by means of a display screen and one of several available input devices, including a keyboard and a mouse. While such interactivity is acceptable in many applications, there are others where a more conventional tactile-type input remote from the computer would be preferable.

For example, many people are far more comfortable with books than with a computer screen. Such people usually prefer to read information from a tangible page than from the screen of a computer. Often such is the case when one has the task of learning a great deal of information such as in school studies. Further, while many may find the visual display of a computer satisfactory, it is well known that some types of learning are far better if some type of direct tactile feedback is available. In this regard younger children, while they may benefit from the modern technology found in todays computers, often find it quite difficult to respond to inquiries posed by the computer through a keyboard or a mouse. There is, therefore, the need for some type of input device which provides an appropriate feedback channel that may be actuated through tactile-type input.

Another example is in the realm of games, whether such games are structured purely for pleasure or have an educational aspect. While many games can be played on a computer utilizing nothing more than the keyboard and a mouse, some computer game enthusiasts still prefer something akin to a normal game board wherein games pieces may be moved from one spot to another as play progresses. Even under such circumstances a computer could be utilized to increase the complexity of the game and automatically keep score and remind players of the proper play order and rules if a suitable tie-in where available between a game board and the computer.

Accordingly, there is a need for an interface between multimedia sources, such as computers and CD-ROM players which will enable a user to provide input to the computer in a manner other than through the keyboard or mouse. Such a device should be of the type which incorporates information in a tangible medium, such as by printing it onto pages or by applying it to a game board. Further, a need exists for such a device that may be manufactured efficiently and requires no direct attachment to the multimedia device. The present invention fulfills these needs and provides other related advantages.

SUMMARY OF THE INVENTION

The present invention resides in a station for providing remote interactivity with a multimedia source, such as a computer or CD-ROM player, which can be advantageously utilized to provide convenient tactile input to the multimedia source either as part of a game or in response to a printed or computer-generated inquiry. The station comprises, generally, a platform including a plurality of conductive pins extending from a platform housing, and a transmitter unit which is removably attachable to the platform housing. The transmitter unit supplies power to the platform and transmits signals to the multimedia source. A fixed medium preferably of a planar configuration is also provided for connecting a plurality of distinct circuits to the platform through the plurality of conductive pins.

More particularly, the transmitter unit includes a multi-pin connector and a power plug connected to a power source and extending from the transmitter unit housing. The platform includes receptacles for the multi-pin connector and the power plug, and distinct pin connection lines which extend from the plurality of conductive pins to the multi-pin connector and power plug receptacles. The transmitter unit housing includes a plurality of snap-on connectors, and the platform housing includes a plurality of corresponding apertures for receiving the snap-on connectors to thereby attach the transmitter unit to the platform. The transmitter unit housing holds batteries which comprise the station's power source, and a beeper.

The planar medium includes a plurality of apertures corresponding to the plurality of conductive pins. Each aperture is at least partially surrounded by a conductive contact pad that engages a respective pin when inserted through the aperture. The planar medium further includes printed power and output circuits therein, and a plurality of touch points where the distinct circuits can be completed.

In one preferred form of the invention, the planar medium comprises interactive paper having the power and output circuits printed therein and wherein the touch points define exposed portions of the power and output circuits. More particularly, the planar medium comprises a plurality of sheets of such interactive paper, wherein the platform housing forms a binder for the interactive paper sheets. The platform housing is connected to a first cover for the interactive paper by means of a flexible hinge. A second cover for the interactive paper is attached to a binder cover by means of a second flexible hinge. The binder cover is attached to the platform housing to bind an edge of the interactive paper therebetween.

In another preferred form of the invention, the planar medium comprises a printed circuit board, an overlying laminate having apertures therethrough corresponding to at least some of the touch points, and an underlying laminate adjacent to the printed circuit board opposite the overlying laminate, including apertures corresponding to at least some of the touch points. The platform housing includes a hinged lid adjacent to the plurality of conductive pins. The hinged lid has a plurality of recesses which correspond to upper ends of the conductive pins. The hinge is pivotable between an open position and a closed position wherein the upper ends of the conductive pins are captured within the recesses of the lid.

A play piece is provided which is at least partially positionable within one of the apertures of the laminates of the planar medium. The play piece includes a housing and a spring-loaded plunger which is movable relative to the housing. The plunger includes a conductive tip which is configured to engage an underlying touch point to complete the corresponding distinct circuit. The play piece preferably includes an identifying resistor that forms a portion of the distinct circuit when the conductive tip engages the touch point.

Other features of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the drawings for purposes of illustration, the present invention is concerned with a station for providing remote interactivity with a multimedia source, such as a computer or a CD-ROM player, wherein the station is generally designated in FIGS. 1–10 by the reference number 30 and in FIGS. 11–22 by the reference number 30'.

In the following description, those elements of the station 30' (FIGS. 11–22) having common structural and/or operational characteristics to similar elements of the station 30 (FIGS. 1–10) will bear the same reference number and be differentiated only by the addition of the prime (') symbol. The stations 30 and 30' comprise a platform 32, 32' which includes a plurality of conductive pins 34, 34' that extend from a platform housing 36, 36'. A transmitter unit 38, 38' is provided which is removably attachable to the platform housing 36, 36'. The transmitter unit 38, 38' provides power to the platform 32, 32' and transmits signals to the multimedia source. A fixed, preferably planar, medium 40, 42 is attached to the platform 32, 32' to connect a plurality of distinct circuits to the platform through the conductive pins 34, 34'.

More particularly, the transmitter unit 38, 38' includes a multi-pin connector 44, 44' and a power plug 46, 46' which extend from a housing 48, 48' for the transmitter unit. The platform 32, 32' includes receptacles 50, 50' and 52, 52' for the multi-pin connector 44, 44' and the power plug 46, 46', respectively. The platform also includes distinct pin connection lines 54, 54' which extend from the conductive pins 34, 34' to the receptacles 50, 50' and 52, 52' for the multi-pin connector and the power plug.

The planar medium 40, 42 includes a plurality of apertures 56, 56' which correspond to the conductive pins 34, 34'. Each aperture 56, 56' is surrounded by a conductive contact pad 58, 58' that engages a respective pin when it is inserted through the aperture. The planar medium 40, 42 further includes printed power and output circuits 60, 60' and 62, 62' therein, and a plurality of touch points 64, 64' where the distinct circuits can be completed.

Figure 1:
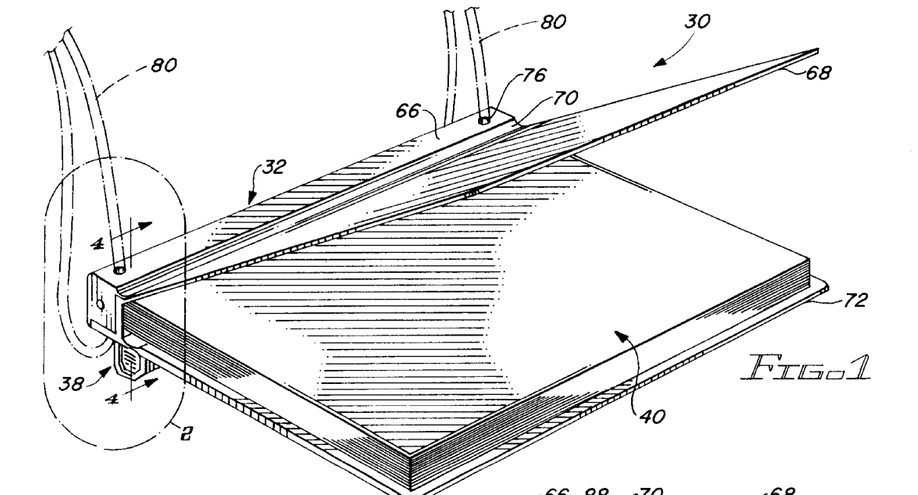
FIG. 1 is a perspective view of a station for providing remote interactivity with a multimedia source, embodying the invention, wherein a front cover of the station is depicted as being partially open and exemplary shoulder straps are shown in phantom.
Figures 2, 3, 5:
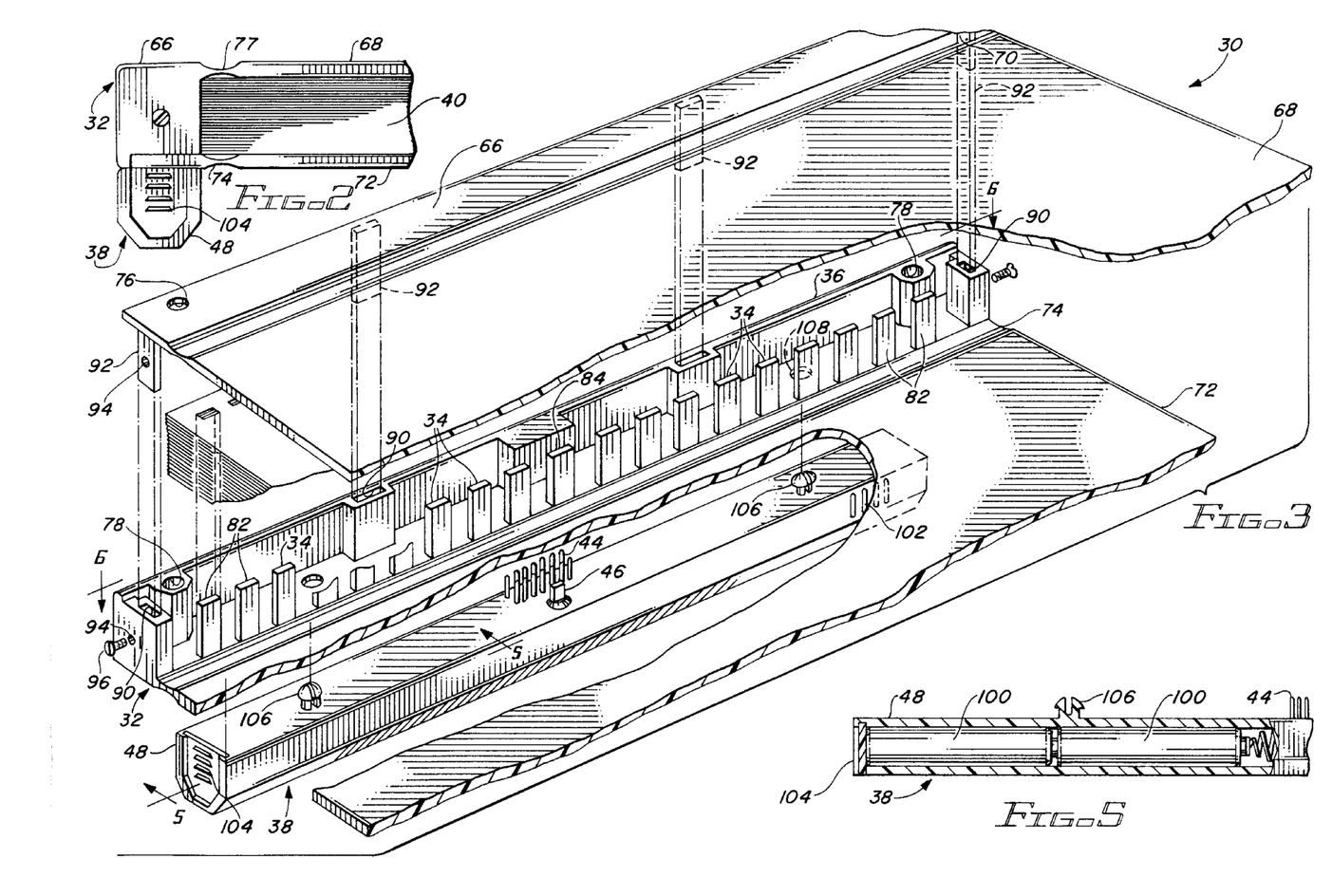
FIG. 2 is an enlarged, fragmented elevational view taken of the area indicated by the number 2 in FIG. 1.
FIG. 3 is an enlarged, fragmented exploded perspective view of the station of FIGS. 1 and 2, wherein the interactive paper has been removed.
FIG. 5 is a fragmented sectional view taken generally along the line 5—5 of FIG. 3, illustrating a battery storage compartment within a portion of a transmitter housing.
Figure 4:
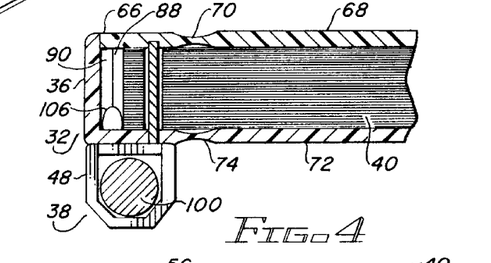
FIG. 4 is an enlarged, fragmented sectional view taken generally along the line 4—4 of FIG. 1.

With reference specifically to the station 30 illustrated in FIGS. 1–10, the planar medium takes the form of a plurality of sheets of interactive paper 40 which are bound along one edge between the platform housing 36 and a housing cover 66. A front page cover 68 is attached to the housing cover 66 by means of a first flexible hinge 70, and a back page cover 72 is attached to the platform 32 by means of a second flexible hinge 74. As illustrated in FIG. 1, the station 30 has the appearance of a book or binder, wherein the pages of interactive paper 40 lie adjacent to one another between the front and back page covers 68 and 72. Apertures 76 and 78 are provided through, respectively, the housing cover 66 and the platform 32 to enable the station 30 to be fitted with shoulder straps 80.

Figures 6, 7, 10:
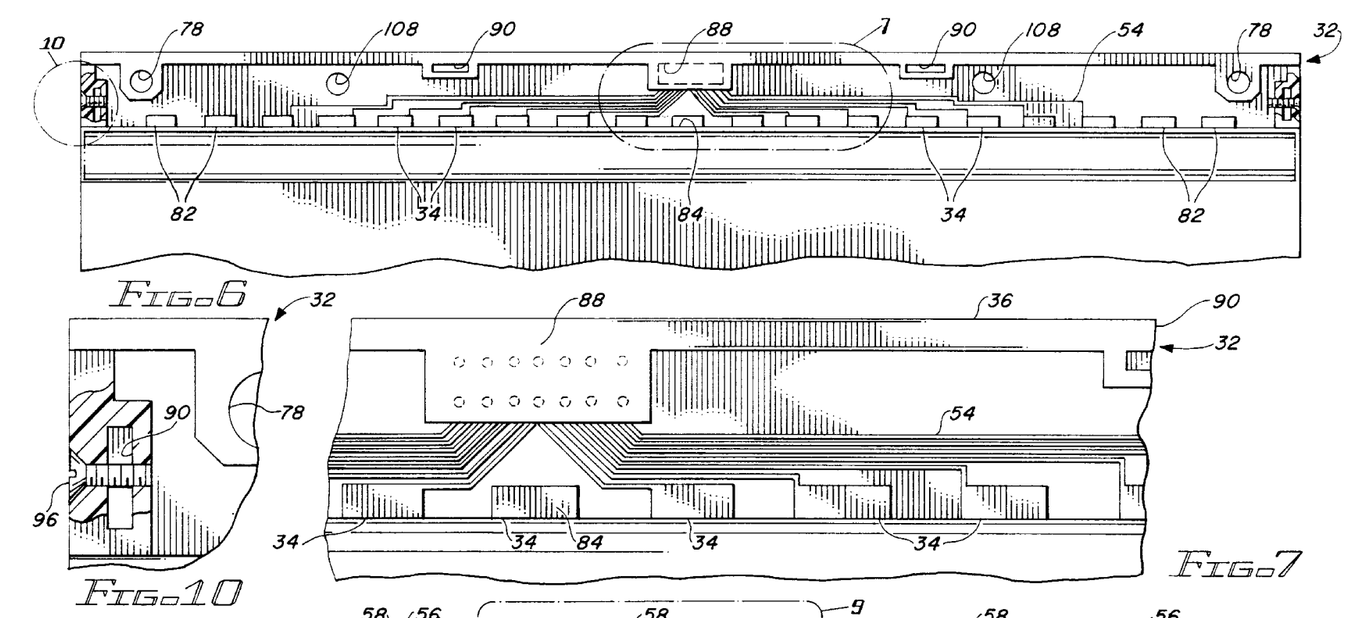
FIG. 6 is an enlarged, fragmented top plan view of the station platform and rear cover, taken generally along the line 6—6 of FIG. 3.
FIG. 7 is an enlarged, fragmented top plan view taken generally of the area indicated by the number 7 in FIG. 6.
FIG. 10 is an enlarged, fragmented and partially sectional view taken of the area 10 in FIG. 6.

The platform 32 comprises a molded component that supports nineteen equidistantly spaced pins. The two pins at each end of the platform 32 are non-conductive pins 82, and the remaining fifteen pins are the conductive pins 34 mentioned above. The central pin 84 of the conductive pins 34 is a power pin through which power is supplied to the interactive paper 40 in a manner to be discussed more fully below. As shown in FIG. 7, the distinct pin connection lines 54 extend from each of the remaining conductive pins 34 to a circuit output housing 88 which defines the receptacle 50 for the multi-pin connector 44.

In order to align the housing cover 66 with the platform 32 and secure it thereto, the platform includes four register slots 90 which are designed to receive corresponding register pins 92 that extend from the housing cover 66. The register slots 90 and register pins 92 at the ends of the platform 32 include aligned apertures 94 through which a screw 96 may be threaded to securely attach the housing cover 66 to the platform 32.

The transmitter unit 38 is designed to be interchangeably utilized with different sizes and types of stations 30 and 30'. The transmitter unit 38 includes a housing 48 for a pair of batteries 100, an electronic transmitter, and a beeper 102. One end of the transmitter unit housing 48 includes a battery door 104 that may be removed and replaced as necessary to change the batteries 100. The multi-pin connector 44 and the power plug 46 extend from one side of the transmitter unit housing (see FIGS. 3, 16 and 19) and are configured for insertion into the corresponding receptacles 50 and 52 of the platform 32 when a pair of split snap-on connectors 106, also extending from the transmitter unit housing 48, are aligned with and inserted into corresponding snap-on connector receiving apertures 108 provided in the platform housing 36 (see FIGS. 18A and 18B) When the transmitter unit 38 is so connected to the platform 32, the power plug 46 transmits electricity from the batteries 100 to the central pin 84. Similarly, the multi-pin connector 44 connects the transmitter within the transmitter unit 38 to the remaining fourteen conductive pins 34 through the circuit output housing 88 and the pin connection lines 54.

Figure 8:
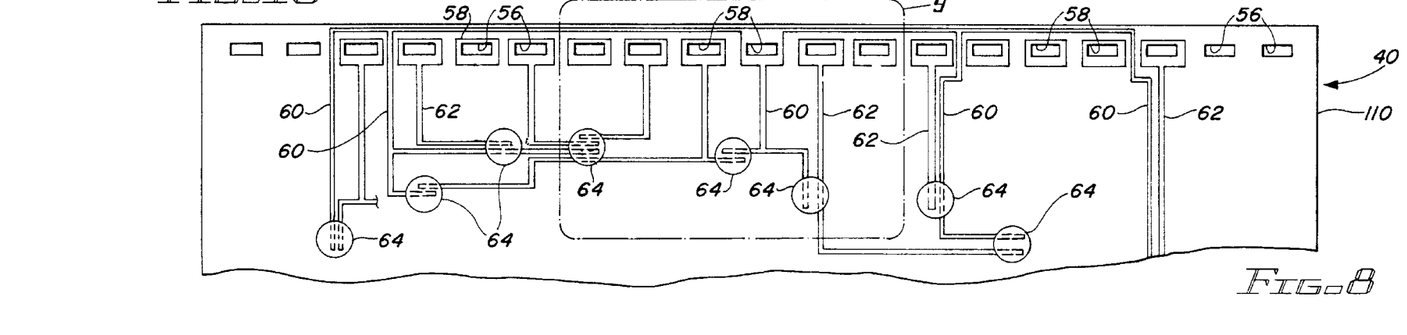
FIG. 8 is a fragmented top plan view of a portion of a piece of interactive paper utilized in the station.
Figure 9:
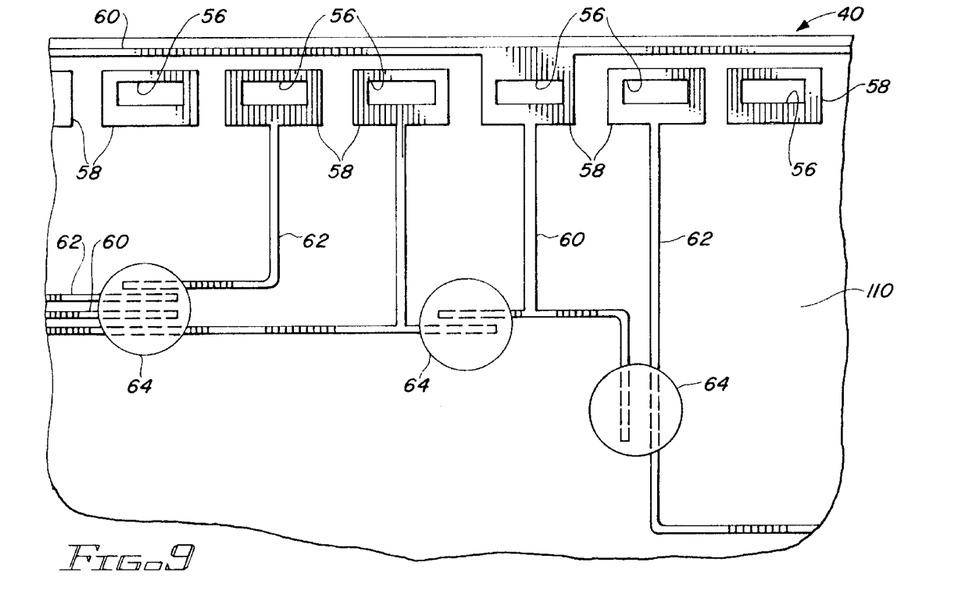
FIG. 9 is an enlarged, fragmented top plan view of the area indicated by the number 9 of FIG. 8.

With reference to FIGS. 8 and 9, the interactive paper 40 includes conductive contact pads 58 which are rectangular spots of invisible conductive material that are overprinted on a base sheet material 110 at the location of each aperture 56. Thus, as the interactive paper 40 is mated with the platform 32 by passing the conductive pins 34 through the apertures 56, the conductive pins make contact with the conductive contact pads 58. The interactive paper 40 further includes thin printed lines of conductive material which lead from the conductive contact pads 58 to small colored circles or touch points 64. These thin printed lines comprise the power circuit 60 and the output circuit 62. The power circuit 60 extends from the conductive contact pad 58 adjacent to the central pin 84. The output circuit 62 extends from various selected ones of the remaining conductive pins 34.

The touch points 64 can be anywhere on a page of the interactive paper 40 and adjacent to graphic images of all kinds printed on the base sheet material 110. The power and output circuits 60 and 62 are exposed at the touch points 64 so that as a person touches one of the touch points 64 with a finger, a discreet circuit is completed and a signal is transmitted through the platform 32 to the transmitter unit 38, which then transmits a signal to a selected type of multimedia component, such as a CD-ROM player or computer. Thus, audio, video or data-based information may be instantly accessed and displayed to support the graphic images on the interactive paper 40.

From the foregoing it will be appreciated that the station 30 is generally of the same size and shape as the modular book binder shown in U.S. Pat. No. 5,338,125 by the same inventors. Fifteen of the pins which hold the pages of interactive paper 40 in place on the platform 32 are made of a conductive material. Fourteen of these conductive pins 34 can carry impulse signals from any number of the interactive paper pages 40. The signals are carried to a small remote transmitter within the transmitter unit 38. The transmitter unit 38 also provides the battery power which is transferred to every page of interactive paper 40 through the central pin 84.

As all of the pins 34 and 82 are molded into the platform housing 32, which is integrally formed with the back cover 72, a variety of back covers and corresponding platforms 32 may be provided, containing different lengths of pins to allow for the publishing of books/stations 30 of different thicknesses.

When fully assembled, each page of the interactive paper 40 is provided electrical power through the power plug 46 which interconnects the batteries 100 with the central pin 84. The base sheet material 110 of the interactive paper pages 40 may contain text and graphic images which prompt a user to place a finger over a selected touch point 64. The finger itself or a conductive covering worn on the fingertip completes the circuit or circuits exposed at the touch point 64, sending a signal through the respective conducted pins 34, the pin connection lines 54 and the circuit output housing 88, and from thence through the multi-pin connector 44 to the transmitter unit 38, which will then transmit an appropriate signal to a selected multimedia component where additional audio, video or data-based information may be instantly accessed and displayed to, as mentioned previously, support the graphics images and text on the selective page of the interactive paper 40.

Reference is now made to the station 30' illustrated in FIGS. 11–22. As mentioned above, those components which are structurally and/or operationally similar to components described in connection with the station 30 of FIGS. 1–10 retain the same reference number distinguished by the prime (') symbol. The station 30' utilizes the same basic configuration of the conductive pins 34' relative to the platform 32', and a removably attachable transmitter unit 38' as noted above. The station 30', as illustrated, provides an interactive platform that is a table-top gateway to a multitude of games and learning activities.

Figures 11, 12A, 12B, 13:
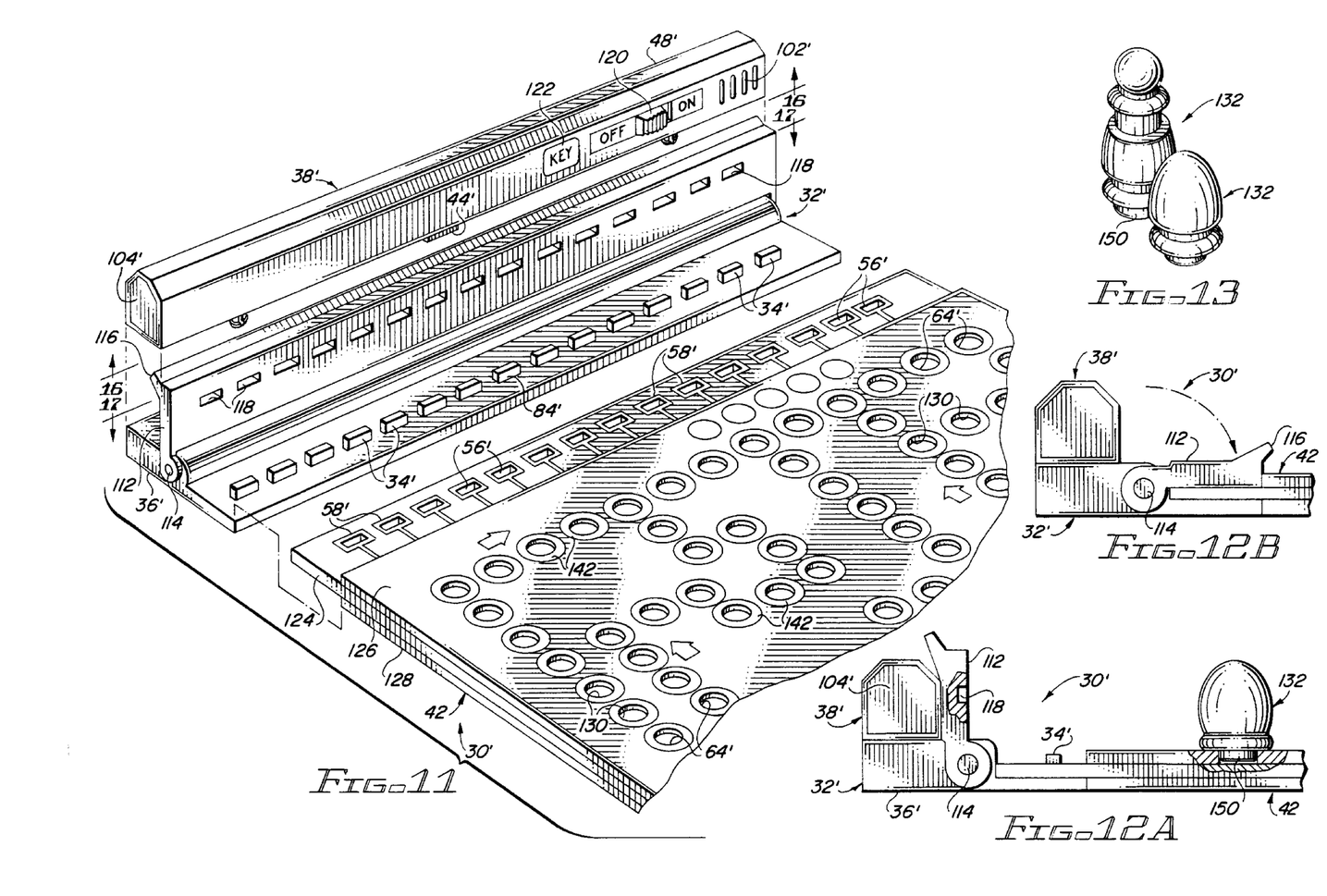
FIG. 11 is a fragmented exploded perspective view of another type of station embodying the invention.
FIG. 12A is a fragmented, partially sectional elevational view of the station side of FIG. 11, illustrating a board property placed relative to the platform, and a platform lid in its open configuration.
FIG. 12B is a view similar to that shown in FIG. 12A, wherein the lid is closed over the conductive pins.
FIG. 13 is a perspective view of two exemplary play pieces utilized with the board of FIGS. 11 and 12.
Figures 14, 18A:
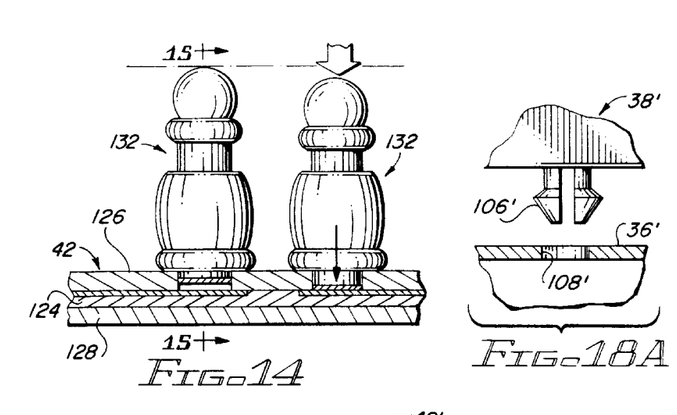
FIG. 14 is a fragmented, partially sectional elevational view of two identical play pieces mounted in adjacent apertures of the board, wherein one of the play pieces is shown depressed so as to make contact between a conductive tip of the play piece and an underlying touch point provided in the board.
FIG. 18A is an enlarged, fragmented and partially sectional view illustrating alignment of a split snap-on connector with a corresponding receiving aperture provided in the platform.

The primary difference between the platform 32' and the platform 32 is the substitution of a hinged lid 112 for the housing cover 66. The lid 112 is connected to the platform 32' by means of a hinge 114 which permits the lid to be pivoted between an open position (FIG. 12A) and a closed position (FIG. 12B). The lid includes a handle 116 that facilitates moving the lid 112 between the open and closed positions. On one side of the lid 112 there are provided a plurality of pin receiving recesses 118 which correspond to the upper ends of the conductive pins 34'. When the lid 112 is pivoted into its closed position, the upper ends of the conductive pins 34' are received within the pin receiving recesses 118. This serves to secure an adjacent portion of the planar medium 42, between the platform housing 36' and the lid 112. In virtually all other aspects, the platform 32' is similar in construction and operation with the platform 32.

The transmitter unit 38' is virtually identical in structure and operation to the transmitter unit 38. The only noticeable difference between the transmitter units 38' and 38 is the inclusion of an on/off switch 120 and a Key pad 122. Thus, when the transmitter unit 38' is attached to the platform 32' by inserting the snap-on connectors 106' through the receiving apertures 108', the multi-pin connector 44' and the power plug 46' are received within the respective receptacles 50' and 52'. When so connected, electricity from the batteries 100' is provided through the power plug 46' to the central pin 84', and each of the remaining fourteen conductive pins 34' are electrically connected to the transmitter within the transmitter unit 38' through the multi-pin connector 44', the circuit output housing 88' and the pin connection lines 54'.

The planar medium for the station 30' comprises a printed circuit board assembly 42 which defines a game or activity board that may be utilized with the platform 32'. Like the interactive paper 40, an edge of the assembly 42 is provided with apertures 56' through which the conductive pins 34' are inserted. When the lid 112 is closed, the assembly 42 is locked in place. The assembly 42 comprises a central printed circuit board 124 which includes the apertures 56' along one edge surrounded by the conductive contact pads 58', the power circuit 60' and the output circuit 62'. The printed circuit board 124 further includes touch points 64' wherein portions of the power and output circuits 60' and 62' are exposed.

An upper laminate sheet 126 overlies the printed circuit board 124, and a lower laminate sheet 128 underlies the printed circuit board 124. The sheets 126 and 128 are approximately ⅛ inch thick, and include die cut apertures 130 that are located to correspond with the touch points 64'. The apertures 130 define recessed touch points 64' which are configured to receive a portion of a play piece 132 therein.

Figure 22:
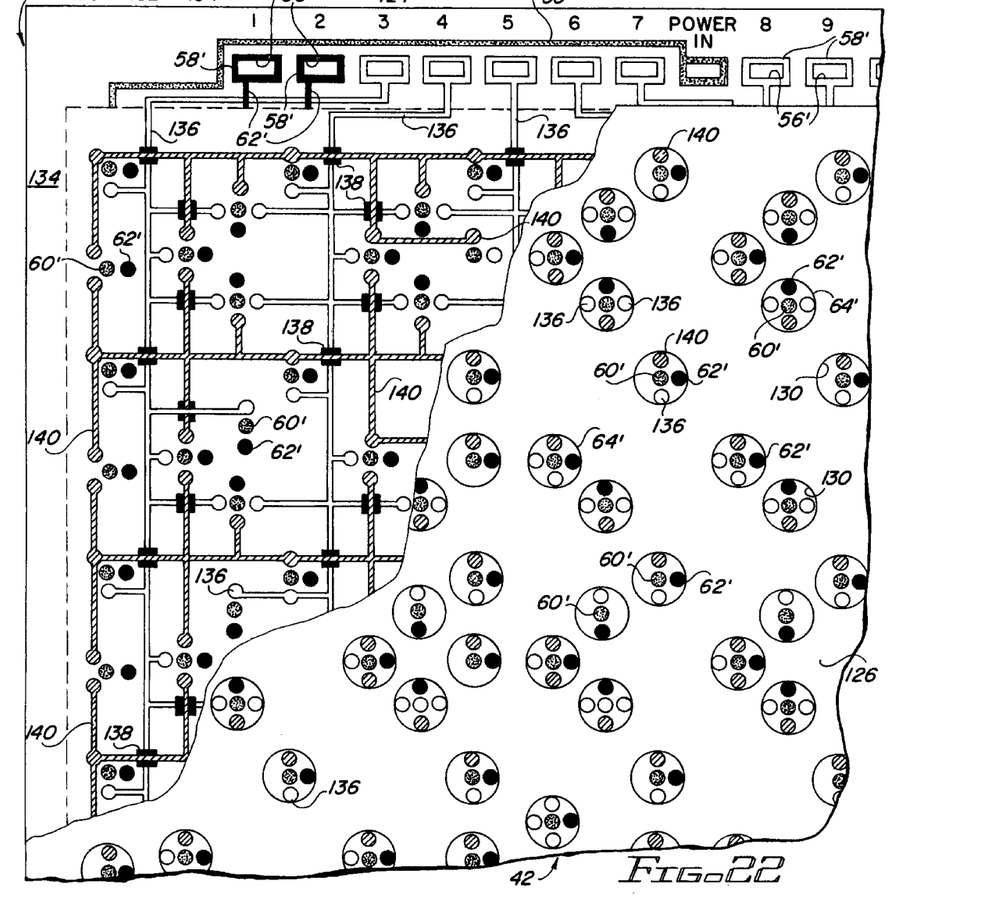
FIG. 22 is a fragmented, partially sectional top plan view of the board of FIG. 11.

With reference to FIGS. 11 and 22, the construction of the assembly 42 will be described. The sample layout contains 115 separate touch points 64'. The printed circuits leading the touch points 64 have the same value, but in the illustrations the circuits are of different gradation only to separate them visually.

The printed circuit board 124 includes a base sheet of material 134 on which two printed circuit tracks are laid down. One such track is the power circuit 60' which extends from the conductive contact pad 58' surrounding the central pin 84'. The other track is the output circuit 62' that provides an output line from every touch point 64'. The output circuits 62' are preferably routed through only pins 1 and 2 (FIG. 22). In this regard, many of the games to be played on the station 30' are designed for as many as four players. In the same assembly 42 layout, each of the four game boards will appear identical when finished, except for a number in an upper left corner. The method for the station 30' to distinguish between game boards and players is implemented during the first printing. Pins 1 and 2 are used to customize each game board so that each board will transmit a completely different set of codes to the transmitter unit 38'.

For example, game board one would route the output circuit 62' from each touch point 64' through pin 1. Game board 2 would route the output circuit 62' through pin 2 only. Game board 3 would route the output circuit 62' from each touch point 64' through both pins 1 and 2. Game board 4 would route the output circuit 62' from each touch point 64' through neither pin 1 nor pin 2. In other words, every code transmitted from board 1 will always include pin 1 and never include pin 2. Board 2 transmissions always include pin 2 and never pin 1. Board 3 always includes both pins 1 and 2. Board 4 never uses either pin 1 nor pin 2. This arrangement allows a processor in the multimedia device receiving signals from the transmitter unit 38' to distinguish between the four transmission sent by the single transmitter, and identify the player who is using each one of the four game boards.

After the first printing, all subsequent printings on the base sheet 134 are identical on all boards. The second printing is an insulation layer which covers the printed circuit tracks for the power circuit 60' and the output circuit 62' leading to the different touch points 64'. Only small dots of conductive material at each touch point 64' are left exposed. The insulation provides a clean surface so that additional printed circuits will not make contact with the first printing.

A third printing of conductive material 136 connects the touch points 64' to pins 3–9. This process begins to provide a separate identity for each touch point 64'. Notably, the third printing of conductive material 136 connects the touch points 64' to pins other than pins 1 and 2.

In FIG. 22 the fourth printing 138 is seen as small dark squares. These squares 138 represent insulation, and they allow the next level of printing to be overlaid without contacting the previous circuit of the third printing 136. The fifth printing 140 connects the remaining conductive pins 34' (pins A–E) to the touch points 64'. These circuits 140 are predominantly horizontal, and in combination with the circuits 136 of third printing form a variation on an X-Y grid. The fifth printing on the base sheet 134 completes the process of giving each touch point 64' a separate identity. Thus, the full identity of a touch point 64' on board 1 might consist of pins 6–7-B-1. The same touch point 64' on board 2 would be 6–7-B-2. On board 3 the same touch point 64' would be 6–7-B-1-2. On board 4 the same touch point 64' would be 6–7-B.

With the completion of the printed circuit board 124, the assembly 42 is finished when the die-cut overlays 126 and 128 are laminated onto the printed circuit board 124. The overlays 126 and 128, as mentioned previously, include die-cut apertures 130 which frame each touch point 64'. The apertures prevent the inadvertent triggering of touch points 64'. Conductive play pieces 132 are utilized to activate the touch points 64'. The overlays 126 and 128 also contain printed graphics, such as colored circles 142 which define the configuration of each game.

The variety of games and inter-activities that can be played on the station 30' are unlimited. New character lines and well-known properties can provide the basis for station 30' products of all kinds. Traditional games can also be adapted to this interactive format.

From a marketing viewpoint, the theming of such new translations is critical to establishing the highest level of visual quality and recognizability. One aspect of such theming is the representation of characters as play pieces 132. Character pieces, both conductive and non-conductive, can provide an exciting continuity with the graphics on the assembly 42.

The touch points 64' on the assembly 42 are recessed at the bottom of ⅛ inch deep holes, which are die-cut into the laminations 126 and 128. Rather than touching the touch points 64' with the tip of a finger, the player use conductive play pieces 132 which fit into the apertures 130.

Figures 15A, 15B, 20, 21:
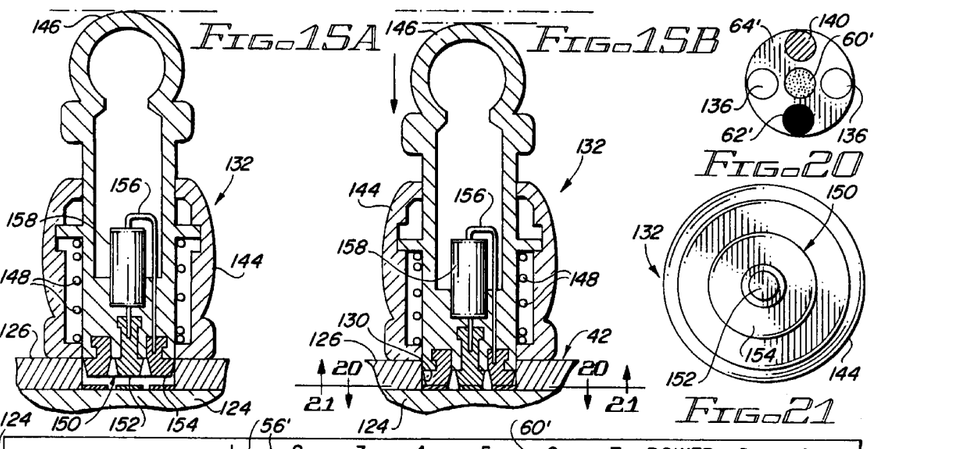
FIG. 15A is an enlarged fragmented sectional view taken generally along the line 15—15 of FIG. 14, illustrating the construction of an exemplary play piece.
FIG. 15B is a sectional view similar to that illustrated in FIG. 15A, wherein the play piece has been depressed such that the conductive tip engages the underlying touch point of the board.
FIG. 20 is a top plan view of a touch point within a die cut aperture of the board, taken generally along the line 20—20 of FIG. 15B.
FIG. 21 is a bottom plan view of the game piece taken generally along the line 21—21 of FIG. 15B.
Figures 16, 17:
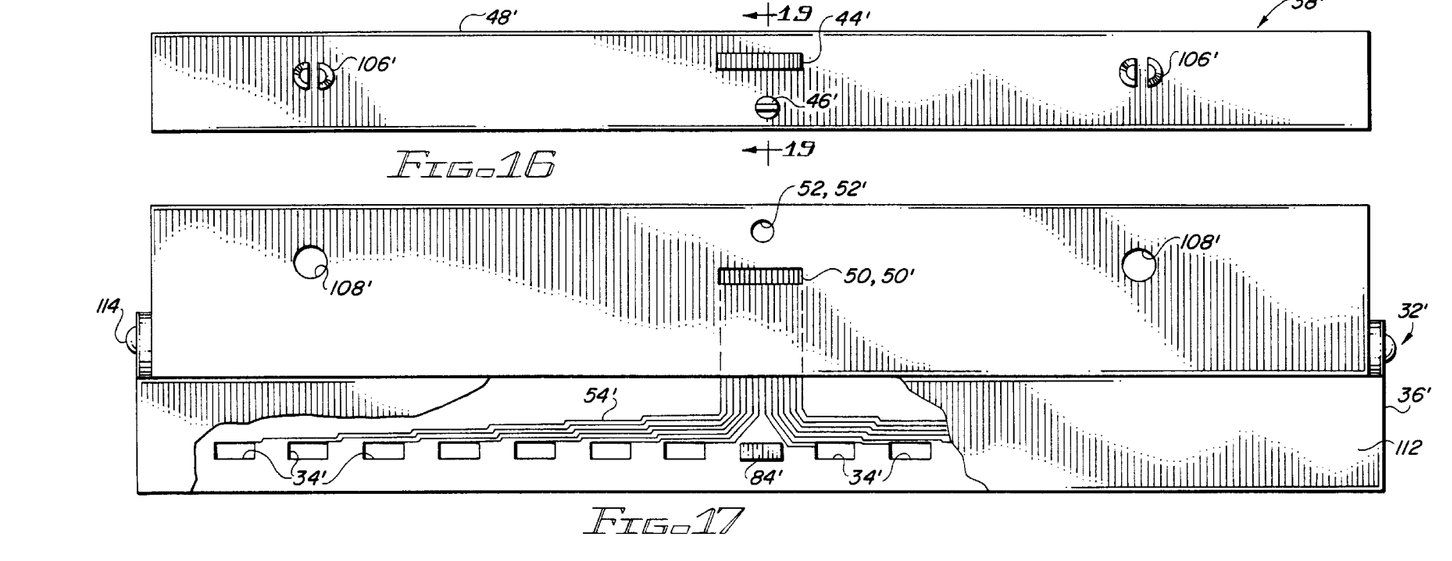
FIG. 16 is a bottom plan view of a transmitter taken generally along the line 16—16 of FIG. 11.
FIG. 17 is a top plan view of the platform taken generally along the line 17—17 of FIG. 11.
Figure 18B:
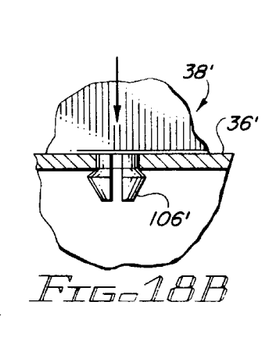
FIG. 18B is a view similar to that shown in FIG. 18A, wherein the transmitter unit is fixed to the platform by means of the split snap-on connector.
Figure 19:
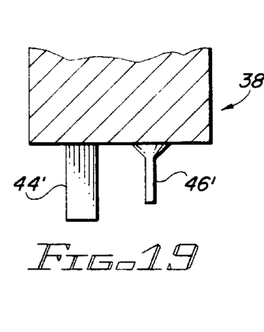
FIG. 19 is an enlarged, fragmented sectional view taken generally along the line 19—19 of FIG. 16.

The play pieces 132 include a housing 144 and a plunger 146 vertically movable relative to the housing 144. A spring 148 biases the plunger 146 upwardly relative to the housing 144. The play pieces 132 are provided a conductive tip 150 that includes a central conductive point 152 and an outer conductive ring 154 that is spaced from the central tip. Within the plunger 146 a circuit 156 connects the central point to the outer ring 154. A resistor 158 is placed within the circuit 156 to provide a means of identifying the particular play piece 132 electronically.

When the tip 150 of the play piece 132 makes contact with a touch point 64', electricity flows through the central conductive point 152, the resistor 158 and out through the outer ring 154 where it makes contact with the output dots 62', 136 and/or 140 of the touch point 64'. Each play piece 132 for a specific game would have a different level of resistance as determined by the resistor 158. Thus, each play piece 132 could easily be identified by the system.

When the spring-loaded plunger 146 is pushed down, its conductive tip 150 extends down and makes contact with the printed touch point 64'. When the top of the plunger 146 is released, the tip 150 springs back up, so the contact is not maintained. The configuration of the assembly 42 prevents the accidental triggering of touch points 64' by a player inadvertently placing a hand on its surface.

Of course, the station 30 can be adapted to be utilized in many different configurations. For example, a robotic stage can be connected to several stations 30' to provide an interface between multiple game boards 42. The robotic stage would contain retractable cords with plug-in connectors that would be plugged into the receptacles 50' and 52' of the platform 32'. The transmitter unit 38' would then be snapped onto the robotic stage, and the outputs from all stations 30' could then be combined into a single transmission from the transmitter unit 38'.

Although two particular embodiments of the invention have been described in detail for purposes of illustration, various modifications of each may be made without departing from the spirit and scope of the invention. Accordingly, the invention is not to be limited, except as by the appended claims.

We claim:

1. A station for providing interactivity with a remote multimedia source, comprising:
   a platform including a platform housing and a plurality of conductive pins extending from the platform housing;
   transmitter unit means removably attachable to the platform housing, for providing power to the platform and for transmitting signals to the remote multimedia source; and
   a fixed medium for connecting a plurality of distinct circuits to the platform through the plurality of conductive pins.

2. The station of claim 1, wherein the fixed medium includes a plurality of apertures corresponding to the plurality of conductive pins, wherein each aperture is at least partially surrounded by a conductive contact pad that engages a respective pin then inserted through the aperture.

3. The station of claim 2, wherein the plurality of conductive pins includes a power pin for transmitting power from the transmitter unit means to the fixed medium.

4. The station of claim 3, wherein the fixed medium includes printed power and output circuits therein, and a plurality of touch points where the distinct circuits can be completed.

5. The station of claim 4, wherein the flexible medium comprises interactive paper having the power and output circuits printed therein and wherein the touch points define exposed portions of the power and output circuits.

6. The station of claim 5, wherein the flexible medium comprises a plurality of interactive paper sheets bound between the platform housing and a housing cover.

7. The station of claim 4, wherein the fixed medium comprises a printed circuit board and an overlying laminate having apertures therethrough corresponding to at least some of the plurality of touch points.

8. The station of claim 7, wherein the fixed medium includes an underlying laminate adjacent to the printed circuit board opposite the overlying laminate, the underlying laminate including apertures corresponding to at least some of the plurality of touch points.

9. The station of claim 7, including a play piece at least partially positionable within one of the apertures of the laminate of the fixed medium, the play piece including a housing and a spring-loaded plunger movable relative to the housing, the plunger including a conductive tip configured to engage an underlying touch point to complete the corresponding distinct circuit.

10. The station of claim 9, wherein the play piece includes an identifying resistor within the plunger that forms a portion of the distinct circuit when the conductive tip engages the touch point.

11. The station of claim 1, wherein the transmitter unit means includes a multi-pin connector and a power plug extending from a transmitter unit housing, and wherein the platform includes receptacles for the multi-pin connector and the power plug, and distinct pin connection lines extending from the plurality of conductive pins to the multi-pin connector and power plug receptacles.

12. The station of claim 11, wherein the transmitter unit housing includes a plurality of snap-on connectors, and wherein the platform housing includes a plurality of corresponding apertures for receiving the snap-on connectors to thereby attach the transmitter unit means to the platform.

13. The station of claim 11, including batteries and a beeper within the transmitter unit housing.

14. The station of claim 11, wherein the flexible medium comprises a plurality of sheets of interactive paper, and wherein the platform housing forms a binder for the interactive paper, the platform housing being connected to a first cover for the interactive paper by means of a flexible hinge, wherein the station further comprises a second cover for the interactive paper, the second cover being attached to a binder cover by means of a second flexible hinge, the binder cover being attached to the platform housing to bind an edge of the interactive paper therebetween.

15. The station of claim 11, wherein the platform housing includes a hinged lid adjacent to the plurality of conductive pins, the hinged lid including a plurality of recesses corresponding to upper ends of the plurality of conductive pins and being pivotable between an open position and a closed position wherein the upper ends of the plurality of conductive pins are captured within the plurality of recesses of the lid.

16. A station for providing remote interactivity with a multimedia source, comprising:
   a transmitter unit including the power source within a transmitter unit housing, means for transmitting signals to the multimedia source, a power plug extending from the transmitter unit housing and connected to the power source, and a multi-pin connector extending from the transmitter unit housing;

a platform including receptacles for the multi-pin connector and the power plug, a platform housing a plurality of conductive pins extending from the platform housing, and distinct pin connection lines extending from the plurality of conductive pins to the multi-pin connector and power plug receptacles; and a planar medium for connecting a plurality of distinct circuits to the platform through the plurality of conductive pins, the planar medium including a plurality of apertures corresponding to the plurality of conductive pins, wherein each aperture is at least partially surrounded by a conductive contact pad that engages a respective pin when inserted through the aperture, printed power and output circuits therein, and a plurality of touch points where the distinct circuits can be completed.

17. The station of claim 16, wherein the planar medium comprises interactive paper having the power and output circuits printed therein and wherein the touch points define exposed portions of the power and output circuits.

18. The station of claim 17, wherein the planar medium comprises a plurality of interactive paper sheets bound between the platform housing and a housing cover.

19. The station of claim 16, wherein the planar medium comprises a printed circuit board and an overlying laminate having apertures therethrough corresponding to at least some of the plurality of touch points.

20. The station of claim 19, including a play piece at least partially positionable within one of the apertures of the laminate, the play piece including a housing and a spring-loaded plunger movable relative to the housing, the plunger including a conductive tip configured to engage an underlying touch point to complete the corresponding distinct circuit, and further including an identifying resistor within the plunger that forms a portion of the distinct circuit when the conductive tip engages the touch point.

21. The station of claim 16, wherein the planar medium comprises a plurality of sheets of interactive paper, and wherein the platform housing forms a binder for the interactive paper, the platform housing being connected to a first cover for the interactive paper by means of a flexible hinge, wherein the station further comprises a second cover for the interactive paper, the second cover being attached to a binder cover by means of a second flexible hinge, the binder cover being attached to the platform housing to bind an edge of the interactive paper therebetween.

22. The station of claim 16, wherein the platform housing includes a hinged lid adjacent to the plurality of conductive pins, the hinged lid including a plurality of recesses corresponding to upper ends of the plurality of conductive pins and being pivotable between an open position and a closed position wherein the upper ends of the plurality of conductive pins are captured within the plurality of recesses of the lid.

* * * * *